United States Patent
Guo et al.

(10) Patent No.: US 11,875,576 B2
(45) Date of Patent: Jan. 16, 2024

(54) TRAFFIC SIGN RECOGNITION METHOD BASED ON LIGHTWEIGHT NEURAL NETWORK

(71) Applicant: QUANZHOU EQUIPMENT MANUFACTURING RESEARCH INSTITUTE, Jinjiang (CN)

(72) Inventors: Jielong Guo, Jinjiang (CN); Xian Wei, Jinjiang (CN); Xuan Tang, Jinjiang (CN); Hui Yu, Jinjiang (CN); Jianfeng Zhang, Jinjiang (CN); Dongheng Shao, Jinjiang (CN); Xiaodi Yang, Jinjiang (CN); Yufang Xie, Jinjiang (CN)

(73) Assignee: QUANZHOU EQUIPMENT MANUFACTURING RESEARCH INSTITUTE, Jinjiang (CN)

( * ) Notice: Subject to any disclaimer, the term of this patent is extended or adjusted under 35 U.S.C. 154(b) by 0 days.

(21) Appl. No.: 18/340,090

(22) Filed: Jun. 23, 2023

(65) Prior Publication Data

US 2023/0334872 A1    Oct. 19, 2023

Related U.S. Application Data

(63) Continuation of application No. PCT/CN2021/107294, filed on Jul. 20, 2021.

(30) Foreign Application Priority Data

Mar. 29, 2021 (CN) .......................... 202110334426.0

(51) Int. Cl.
*G06V 20/58* (2022.01)
*G06V 10/77* (2022.01)
(Continued)

(52) U.S. Cl.
CPC ............ *G06V 20/582* (2022.01); *G06V 10/26* (2022.01); *G06V 10/32* (2022.01); *G06V 10/764* (2022.01);
(Continued)

(58) Field of Classification Search
CPC ...... G06V 20/582; G06V 10/26; G06V 10/32; G06V 10/764; G06V 10/7715; G06V 10/774; G06V 10/776; G06V 10/82
See application file for complete search history.

(56) References Cited

U.S. PATENT DOCUMENTS

2020/0104692 A1* 4/2020 Hill ........................... G06F 5/06
2020/0293864 A1* 9/2020 Nagel .................... G06N 3/084
(Continued)

FOREIGN PATENT DOCUMENTS

CN     110188705 A     8/2019
CN     110929603 A     3/2020
(Continued)

OTHER PUBLICATIONS

Dang et al. "Depth-Wise Separable Convolution Neural Network with Residual Connection for Hyperspectral Image Classification" Remote Sens. 2020, 12, 3408.

*Primary Examiner* — Ming Y Hon
(74) *Attorney, Agent, or Firm* — Rachel Pilloff; Sean Passino; Martin Cosenza (57) ABSTRACT

Provided is a traffic sign recognition method based on a lightweight neural network, which including: a lightweight neural network model is constructed for training and pruning to obtain a lightweight neural network model; the lightweight neural network model comprises a convolution feature extraction part and a classifier part; the convolution feature extraction part includes one layer of conventional 3×3 convolution and 16 layers of separable asymmetric convolution. The classifier part includes three layers of separable full connection modules.

6 Claims, 5 Drawing Sheets

(51) Int. Cl.
  *G06V 10/32* (2022.01)
  *G06V 10/82* (2022.01)
  *G06V 10/26* (2022.01)
  *G06V 10/774* (2022.01)
  *G06V 10/776* (2022.01)
  *G06V 10/764* (2022.01)

(52) U.S. Cl.
  CPC .......... *G06V 10/774* (2022.01); *G06V 10/776* (2022.01); *G06V 10/7715* (2022.01); *G06V 10/82* (2022.01)

(56) References Cited

U.S. PATENT DOCUMENTS

| | | | |
|---|---|---|---|
| 2021/0089921 A1* | 3/2021 | Aghdasi | G06N 5/04 |
| 2021/0106314 A1* | 4/2021 | Aladahalli | G06V 10/26 |
| 2021/0383231 A1* | 12/2021 | Liu | G06F 18/231 |
| 2022/0061816 A1* | 3/2022 | Lee | A61B 8/4494 |
| 2022/0092795 A1* | 3/2022 | Liu | G06T 3/4007 |
| 2022/0101576 A1* | 3/2022 | Kaushik | A61B 5/0033 |
| 2022/0122267 A1* | 4/2022 | Sheshkus | G06N 3/048 |
| 2022/0156554 A1* | 5/2022 | Fu | G06N 3/04 |
| 2022/0319155 A1* | 10/2022 | Lu | G06N 3/045 |
| 2022/0327189 A1* | 10/2022 | Belli | G06F 21/552 |
| 2023/0053838 A1* | 2/2023 | Namiki | G06T 7/194 |

FOREIGN PATENT DOCUMENTS

| | | |
|---|---|---|
| CN | 111242180 A | 6/2020 |
| CN | 111444760 A | 7/2020 |
| CN | 111626328 A | 9/2020 |
| CN | 111914797 A | 11/2020 |
| CN | 113537138 A | 10/2021 |
| WO | 2020247545 A1 | 12/2020 |

* cited by examiner

TRAFFIC SIGN RECOGNITION METHOD BASED ON LIGHTWEIGHT NEURAL NETWORK

CROSS-REFERENCE TO RELATED APPLICATIONS

This application is a continuation of PCT/CN2021/107294, filed on Jul. 20, 2021 and claims priority of Chinese Patent Application No. 202110334426.0, filed on Mar. 29, 2021, the entire contents of which are incorporated herein by reference.

TECHNICAL FIELD

The application relates to a traffic sign recognition method.

BACKGROUND

As a mature application in the field of computer vision, image recognition has attracted growing attention from all walks of life. In the academic field, various image recognition competitions for public data sets have been organized one after another, and various convolutional neural network models based on this have continuously improved their performance. In the industrial field, image recognition has many applications in face recognition, traffic sign recognition, food safety detection and so on.

Because of the superior performance of convolutional neural network in image recognition, many intelligent applications need to be deployed on small mobile or embedded terminal devices. The traffic sign recognition algorithm based on convolutional neural networks requires high computing power and storage space of the computing platform, which hinders the application of the algorithm in intelligent terminal devices. Therefore, lightweight treatment is performed on the traffic sign recognition algorithm based on convolutional neural network and the model is pruned, which may greatly reduce the calculation cost and storage requirements of the algorithm, so the algorithm may run quickly and accurately on the vehicle-mounted platform, which has important practical value.

SUMMARY

The objective of the application is to provide a method for reducing the parameter scale and calculation amount of the network while ensuring the recognition accuracy, so as to improve the recognition speed of the neural network model deployed in the vehicle-mounted platform environment.

The objective of the present application is achieved by the following technical scheme.

A traffic sign recognition method based on a lightweight neural network, including the following steps.

step 1, acquiring initial traffic sign image data;

step 2, data preprocessing: preprocessing the initial traffic sign image data to obtain a traffic sign data set with a training set and a test set;

step 3, setting an initial training super-parameter, inputting a training set part of the traffic sign data set into a lightweight neural network model for a training, and recognizing a trained lightweight neural network model by using a test set part of the traffic sign data set;

step 4, checking whether a recognition accuracy of the model on the test set reaches more than 90%; if not, adjusting the training super-parameter and going to the step 3; otherwise, going to step 5;

step 5, pruning the lightweight neural network model, setting an initial pruning rate to 50%, then performing a retraining on a pruned lightweight neural network model on the training set of the traffic sign data set, and recognizing a trained pruned lightweight neural network model on a test set of the traffic sign data set;

step 6, checking the recognition accuracy of the trained pruned lightweight neural network model; if a loss of the recognition accuracy is less than 1%, saving the model and continuing to increase the pruning rate with a step length of 2%, and turning to the step 5, if the loss of the recognition accuracy exceeds 1%, judging whether it is a first pruning result; if it is the first pruning result, reducing the pruning rate with a step length of 10% and returning to the step 5; if it is not the first pruning result, going to step 7;

step 7, saving the pruned lightweight neural network model last time; and step 8, deploying the pruned lightweight neural network model last time in a vehicle-mounted system to recognize traffic signs on a road.

The lightweight neural network model includes a convolution feature extraction part and a classifier part.

The convolution feature extraction part includes a layer of conventional 3×3 convolution and 16 layers of separable asymmetric convolution; the separable asymmetric convolution includes a first separable asymmetric convolution and a second separable asymmetric convolution.

The classifier part includes three layers of separable full connection modules.

The first separable asymmetric convolution firstly carries out feature separation on each input channel; secondly, a 1×3 convolution and a 3×1 convolution with a step length of 1 and a padding of 0 are respectively performed on each channel; after the convolution, obtaining two single-channel feature maps with same sizes trained by a nonlinear Relu (Rectified Linear Unit) activation function; then summing corresponding elements of the two single-channel feature maps respectively, and performing a batch normalization on each channel summed and training with an Relu activation function in turn; then merging and shuffling each newly formed channel; finally, performing a 1×1 convolution with a step length of 1 on output channels, and setting a number of convolution kernels equal to a number of input channels.

The second separable asymmetric convolution firstly carries out feature separation on each input channel; secondly, a 1×3 convolution and a 3×1 convolution with a step length of 1 and a padding of 0 are respectively performed on each channel; after the convolution, obtaining two single-channel feature maps with same sizes trained by a nonlinear Relu activation function; then summing corresponding elements of the two single-channel feature maps respectively, and performing a batch normalization on each channel summed and training with an Relu activation function in turn; then merging and shuffling each newly formed channel; finally, performing a 1×1 convolution with a step length of 2 on output channels to complete a downsampling of the feature maps, and setting a number of the convolution kernels equal to a number of input channels.

The structure of the conventional 3×3 convolution is as follows: the number of input channels is 3, a number of output channels is 64, a convolution kernel size is 3×3, the number of the convolution kernels is 64, the step length is 1, and the padding is 0; after the conventional 3×3 convolution, a feature map with a length and a width of 64×64 and a channel of 64 is obtained.

The 2nd to 5th layers of the convolution feature extraction part adopt the first separable asymmetric convolution, wherein a full line part of a residual connection mode indicates that the 1×1 convolution with a step length of 1 is adopted, and the number of the convolution kernels is 64; after the first separable asymmetric convolution of the 2nd to the 5th layers, a feature map with a length and a width of 64×64 and a channel of 64 is obtained.

A 6th layer of the convolution feature extraction part adopts the second separable asymmetric convolution, and after the second separable asymmetric convolution of the 6th layer, a feature map with a length and a width of 32×32 and a channel of 64 is obtained.

The $7^{th}$- to $11^{th}$ layers of the convolution feature extraction part adopt the first separable asymmetric convolution, where a dotted line part of the residual connection mode indicates a 1×1 convolution with a step length of 2 is adopted, and the number of the convolution kernels is 64, while the full line part of the residual connection mode adopts a 1×1 convolution with a step length of 1, and the number of the convolution kernels is 64; after the first separable asymmetric convolution of the $7^{th}$- to $11^{th}$ layers, a feature map with a length and width of 32×32 and a channel of 64 is obtained.

A 12th layer of the convolution feature extraction part adopts the second separable asymmetric convolution, and after the second separable asymmetric convolution of the 12th layer, a feature map with a length and width of 16×16 and a channel of 64 is obtained.

The $13^{th}$- to $15^{th}$ layers of the convolution feature extraction part adopt the first separable asymmetric convolution, where the dotted line part of the residual connection mode indicates a 1×1 convolution with a step length of 2 is adopted, and the number of the convolution kernels is 64; the full line part of the residual connection mode adopts 1×1 convolution with step length of 1, and the number of the convolution kernels is 64; after that first separable asymmetric convolution of the $13^{th}$- to $15^{th}$ layers, a feature map with a length and a width of 16×16 and a channel of 64 is obtained.

A 16th layer of the convolution feature extraction part adopts the second separable asymmetric convolution; after the second separable asymmetric convolution of the 16th layer, a feature map with a length and a width of 8×8 and a channel of 64 is obtained.

A 17th layer of the convolution feature extraction part adopts the first separable asymmetric convolution; wherein the dotted line part of the residual connection mode indicates that a 1×1 convolution with a step length of 2 is adopted, and the number of the convolution kernels is 64; after the first separable asymmetric convolution of the 17th layer, a feature map with a length and a width of 8×8 and a channel of 64 is obtained.

A BN layer and an activation layer are added after each convolution operation in the separable asymmetric convolution, and activation functions used by the activation layer are all Relu functions.

a first layer of separable full connection module of the classifier part firstly converts a feature map of a previous layer with a length and a width of 8×8 and a channel of 64 into a shape of 64×64, and then initializes two weight matrixes with sizes of A-1 (64×64) and B-1 (64×64) respectively, and then performs a matrix multiplication with a matrix A-1 and an input after a dimension conversion, and an obtained result is matrix multiplied with the matrix B-1 to obtain an output matrix with a size of 64×64 of a next layer;

a second layer of separable full connection module firstly respectively initializes two weight matrixes with the sizes of A-2 (64×64) and B-2 (64×64) respectively, and finally a matrix A-2 is used to perform the matrix multiplication with an output matrix with a size of 64×64 of a previous layer, and then performs the matrix multiplication with the matrix B-2 to obtain an output matrix with a size of 64×64 of a next layer;

a third layer of separable full connection module firstly respectively initializes two weight matrixes with the sizes of A-3 (1×64) and B-3 (64×64) respectively, and then performs the matrix multiplication with an output matrix with a size of 64×64 of a previous layer, and then an obtained result performs the matrix multiplication with a matrix B-3 to obtain an output matrix with a size of 64×64 of a next layer; finally, the output matrix is flattened after a Flatten operation, and a softmax activation function is used to recognize 64 categories of traffic signs.

The data preprocessing includes determining a size of traffic sign image data, selecting appropriate candidate frames, completing a clipping of the initial traffic sign image data, uniformly setting clipped color images with a resolution of 64×64, classifying clipped data, and expanding each category data by using a data enhancement method; the data enhancement method specifically includes a slight horizontal or vertical translation of images, an adjustment of image saturation and a whitening treatment to make a number of traffic sign categories consistent, then marking the traffic sign image data, and then dividing the training set and the test set according to a ratio of 8:2 to construct a traffic sign data set.

The application has the following beneficial effects.

Firstly, a lightweight traffic sign recognition model is constructed by designing a lightweight neural network and a model pruning method, has less parameters and a larger recognition speed, and may realize high-accuracy traffic sign recognition on a vehicle-mounted platform.

Secondly, the number of convolution output channels in each layer of the feature extraction part of the application is 64, which ensures that the number of input channels is equal to the number of output channels in a plurality of convolution layers, so the memory access cost may be reduced to a great extent, thereby accelerating the recognition speed of the traffic sign recognition model.

Thirdly, compared with the deep separable convolution, the separable asymmetric convolution of the application requires fewer parameters, and the whole network model also draws lessons from residual, and connects the input feature map to the output through bypass connection, so gradient loss and gradient explosion are effectively avoided, and the network is more stable so as to improve the training effect.

Fourthly, compared with the conventional full connection layer, the classifier part of the application uses fewer parameters. By decomposing the weight matrix of the full connection layer and retraining two small weight matrixes on each layer, not only the parameters are reduced, but also the over-fitting problem caused by too large parameter may be prevented.

Fifthly, the model pruning method of the present application is carried out on the basis of deep separable asymmetric convolution, and the importance of each convolution kernel is judged by calculating the L1 norm of each convolution kernel in the point-by-point convolution part, and then a certain pruning rate is set to prune the convolution kernels in the point-by-point convolution part, and finally the pruned model has less parameters and plays a normalization effect to a certain degree.

BRIEF DESCRIPTION OF THE DRAWINGS

The present application will be described in further detail with reference to the attached drawings.

DETAILED DESCRIPTION OF THE EMBODIMENTS

Figure 1:
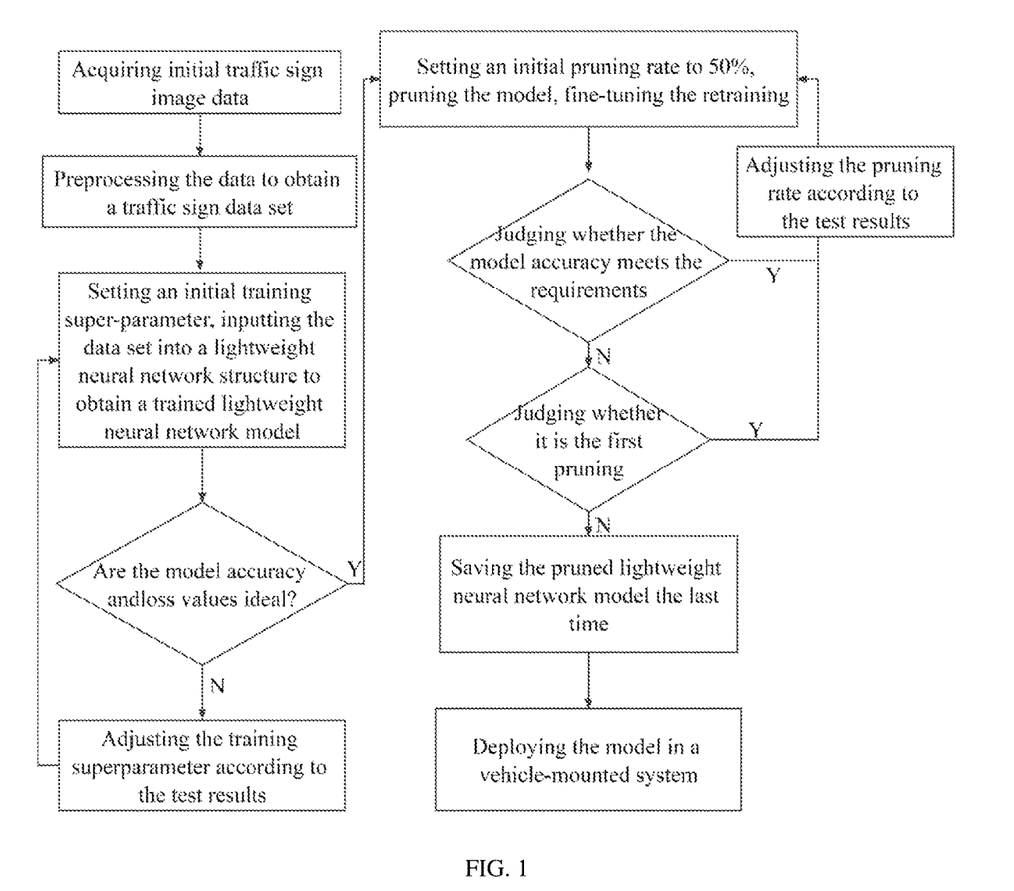
FIG. 1 is an overall flow chart of the present application.

As shown in FIG. 1, a traffic sign recognition method based on lightweight network provided by the present application includes the following steps.

step 1, obtaining initial traffic sign image data, shooting a large number of traffic signs of the road street scenes by using a camera to obtain traffic sign images or videos at different time periods, different weather conditions and different angles, and obtaining the initial traffic sign data information;

step 2, data preprocessing: determining the size of traffic sign image data and selecting appropriate candidate frames to finish cutting the initial traffic sign image data, uniformly setting color (RGB) images with the resolution of 64×64 after cutting, classifying the cut data, and expanding each category data by using data enhancement methods. The data enhancement method specifically includes slight horizontal or vertical translation of the image, adjustment of image saturation, whitening treatment, etc., so that the number of each traffic sign category is consistent, then marking the traffic sign data image, and finally dividing the training set and the test set according to the ratio of 8:2 to construct the traffic sign data set;

step 3, constructing a lightweight neural network model, sending the traffic sign data set pretreated in step 2 to the network for training in batches, and recognizing the trained lightweight neural network model by using the test set part of the traffic sign data set;

step 4, checking whether a recognition accuracy of the model on the test set reaches more than 90%, if not meet the requirements, adjusting the learning rate, data batch, iteration times and other super-parameters, and going to step 3, if the result is ideal, going to step 5;

step 5, pruning the lightweight neural network model, setting an initial pruning rate to 50%, then performing a retraining on a pruned lightweight neural network model;

step 6, after the model pruning is completed, checking the recognition accuracy of a trained pruned lightweight neural network model; if a loss of the recognition accuracy is less than 1%, saving the model and continue to increase the pruning rate with a step length of 2%, and going to step 5, if the loss of the recognition accuracy exceeds 1%, judging whether it is a first pruning result; if it is the first pruning result, reducing the pruning rate with a step length of 10% and regoing to step 5; if it is not the first pruning result, going to step 7.

step 7, saving the pruned lightweight neural network model last time; and;

step 8, deploying the pruned lightweight neural network model last time in a vehicle-mounted system to recognize traffic signs on a road, and performing displaying and/or voice prompt the recognition results.

Figure 3:
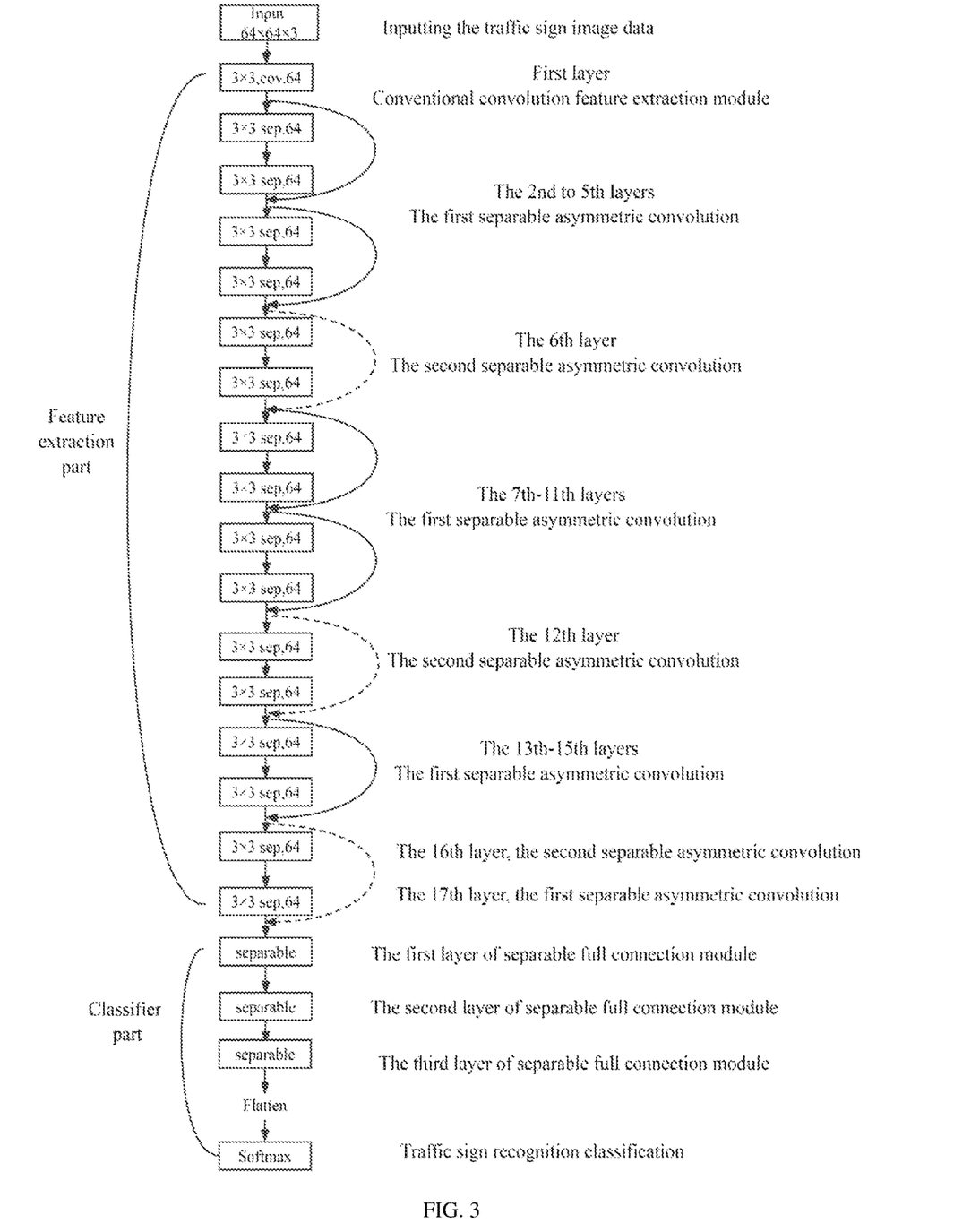
FIG. 3 is a lightweight neural network model.

As shown in FIG. 3, the lightweight neural network model includes a convolution feature extraction part and a classifier part; the convolution feature extraction part includes one layer of conventional 3×3 convolution and 16 layers of self-designed separable asymmetric convolution modules, wherein:

conventional 3×3 convolution structure: the number of input channels is 3, the number of output channels is 64, the size of convolution kernel is 3×3, the number of convolution kernels is 64, the step length is 1, and the padding is 0. After conventional 3×3 convolution, a feature map with a length and a width of 64×64 and the number of channels of 64 is obtained.

The separable asymmetric convolution is integrated into a first separable asymmetric convolution and a second separable asymmetric convolution;

The first separable asymmetric convolution firstly carries out feature separation on each input channel; secondly, a 1×3 convolution and a 3×1 convolution with a step length of 1 and a padding of 0 are respectively performed on each channel; after the convolution, obtaining two single-channel feature maps with same sizes by a nonlinear Relu (Rectified Linear Unit) activation function; then summing corresponding elements of the two single-channel feature maps respectively, and performing a batch normalization on each channel summed and by an Relu activation function in turn; then merging and shuffling each newly formed channel; finally, performing a 1×1 convolution with a step length of 1 on output channels, and setting that a number of convolution kernels is equal to a number of input channels;

The second separable asymmetric convolution firstly carries out feature separation on each input channel; secondly, a 1×3 convolution and a 3×1 convolution with a step length of 1 and a padding of 0 are respectively performed on each channel; after the convolution, obtaining two single-channel feature maps with same sizes by a nonlinear Relu activation function; then summing corresponding elements of the two single-channel feature maps respectively, and performing a batch normalization on each channel summed and by an Relu activation function in turn; then merging and shuffling each newly formed channel; finally, performing a 1×1 convolution with a step length of 2 on output channels to complete a downsampling of the feature maps, and setting that a number of the convolution kernels is equal to a number of input channels.

2nd to 5th layers of the convolution feature extraction part adopt the first separable asymmetric convolution, wherein a full line part of a residual connection mode indicates that the 1×1 convolution with a step length of 1 is adopted, and the number of the convolution kernels is 64; after the first separable asymmetric convolution of the 2nd to the 5th layers, a feature map with a length and a width of 64×64 and a channel of 64 is obtained.

A 6th layer of the convolution feature extraction part adopts the second separable asymmetric convolution, and after the second separable asymmetric convolution of the 6th layer, a feature map with a length and a width of 32×32 and a channel of 64 is obtained.

$7^{th}$- to $11^{th}$ layers of the convolution feature extraction part adopt the first separable asymmetric convolution, wherein a dotted line part of the residual connection mode indicates a 1×1 convolution with a step length of 2 is adopted, and the number of the convolution kernels is 64, while the full line part of the residual connection mode adopts a 1×1 convolution with a step length of 1, and the number of the convolution kernels is 64; after the first separable asymmetric convolution of the $7^{th}$- to $11^{th}$ layers, a feature map with a length and width of 32×32 and a channel of 64 is obtained.

A 12th layer of the convolution feature extraction part adopts the second separable asymmetric convolution, and after the second separable asymmetric convolution of the 12th layer, a feature map with a length and width of 16×16 and a channel of 64 is obtained.

$13^{th}$- to $15^{th}$ layers of the convolution feature extraction part adopt the first separable asymmetric convolution, wherein the dotted line part of the residual connection mode indicates a 1×1 convolution with a step length of 2 is adopted, and the number of the convolution kernels is 64; the full line part of the residual connection mode adopts 1×1 convolution with step length of 1, and the number of the convolution kernels is 64; after that first separable asymmetric convolution of the $13^{th}$- to $15^{th}$ layers, a feature map with a length and a width of 16×16 and a channel of 64 is obtained.

A 16th layer of the convolution feature extraction part adopts the second separable asymmetric convolution; after the second separable asymmetric convolution of the 16th layer, a feature map with a length and a width of 8×8 and a channel of 64 is obtained.

A 17th layer of the convolution feature extraction part adopts the first separable asymmetric convolution; wherein the dotted line part of the residual connection mode indicates that a 1×1 convolution with a step length of 2 is adopted, and the number of the convolution kernels is 64; after the first separable asymmetric convolution of the 17th layer, a feature map with a length and a width of 8×8 and a channel of 64 is obtained.

In order to improve the training convergence speed, a BN layer and an activation layer are added after each convolution operation in the separable asymmetric convolution module. The activation functions used by the activation layer are Relu functions.

In order to further reduce the parameter, the classifier part is connected after the feature extraction part, and three layers of separable full connection modules are designed. The first layer of separable full connection module of a classifier part firstly converts a feature map of a previous layer with a length and a width of 8×8 and a channel of 64 into a shape of 64×64, and then initializes two weight matrixes with sizes of A-1 (64×64) and B-1 (64×64) respectively, and then, performs a matrix multiplication with the matrix A-1 and an input after a dimension conversion, and an obtained result is matrix multiplied with a matrix B-1 to obtain an output matrix with a size of 64×64 of a next layer.

The second layer of separable full connection module firstly respectively initializes two weight matrixes with the sizes of A-2 (64×64) and B-2 (64×64) respectively, and finally a matrix A-2 is used to perform the matrix multiplication with an output matrix with a size of 64×64 of a previous layer, and then performs the matrix multiplication with the matrix B-2 to obtain an output matrix with a size of 64×64 of a next layer.

The third layer of separable full connection module firstly respectively initializes two weight matrixes with the sizes of A-3 (1×64) and B-3 (64×64) respectively, and then performs the matrix multiplication with an output matrix with a size of 64×64 of a previous layer, and then an obtained result performs the matrix multiplication with a matrix B-3 to obtain an output matrix with a size of 64×64 of a next layer; finally, the output matrix is flattened after a Flatten operation, and a softmax activation function is used to recognize 64 categories of traffic signs.

Furthermore, in order to reduce the parameter and operation speed as a whole, the trained lightweight neural network model is pruned.

The deep separable convolution in MobileNetV1 network includes two convolution methods, the first is channel-by-channel grouping convolution, and the second is point-by-point convolution. If the influence of offset Parameters is not considered, the parameters of channel-by-channel packet convolution are as follows:

$$R_1 = D_k \times D_k \times 1 \times 1 \times M,$$

where: $D_k \times D_k$ is the convolution kernel size, which is usually expressed by 3×3. M is the number of input channels. Parameter of point-by-point convolution is as follows:

$$R_2 = 1 \times 1 \times M \times N,$$

where N is the number of convolution kernels or the number of output channels.

Figure 2:
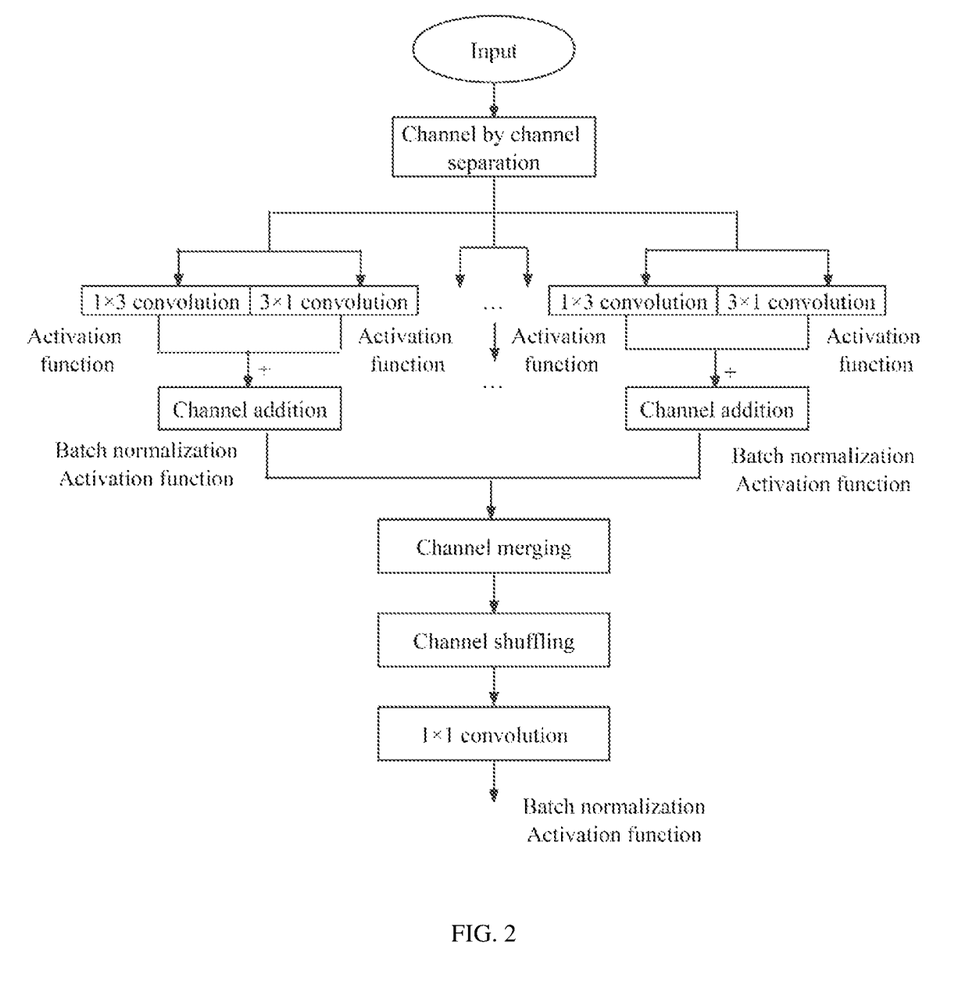
FIG. 2 is a separable asymmetric convolution.

As shown in FIG. 2, a separable asymmetric convolution module designed for this method is also composed of two convolution modes, which is different from the first convolution mode of deep separable convolution. The method firstly performs feature separation on each input channel, and then performs a 1×3 convolution and a 3×1 convolution with a step length of 1 on each channel respectively, and adopts corresponding padding methods for different convolutions, so that the two single-channel feature maps with nonlinear Relu activation function after convolution have the same size in scale. Secondly, the corresponding elements of the two single-channel feature maps are summed respectively. If the influence of offset parameters is not considered, the parameter of this process may be expressed as:

$$R_3 = (1 \times D_k + D_k \times 1) \times 1 \times 1 \times M$$

Different from the second convolution method of deep separable convolution, although point-by-point convolution is used, the latter shuffles the merged channels before convolution, which effectively solves the problem of poor information flow between channels and improves the feature extraction ability of separable asymmetric convolution module. Therefore, the parameter reduction of the separable asymmetric convolution module designed by this method depends on the difference of the first convolution mode compared with that in MobileNetV1, and the parameter reduction is as follows:

$$R_4 = R_1 - R_3 = (D_K^2 - 2D_K) \times 1 \times 1 \times M$$

When $D_K=3$ and M=64, under the same conditions, compared with the deep separable convolution in Mobilene ETV 1 network, this method reduces the parameters by 192.

Figure 4:
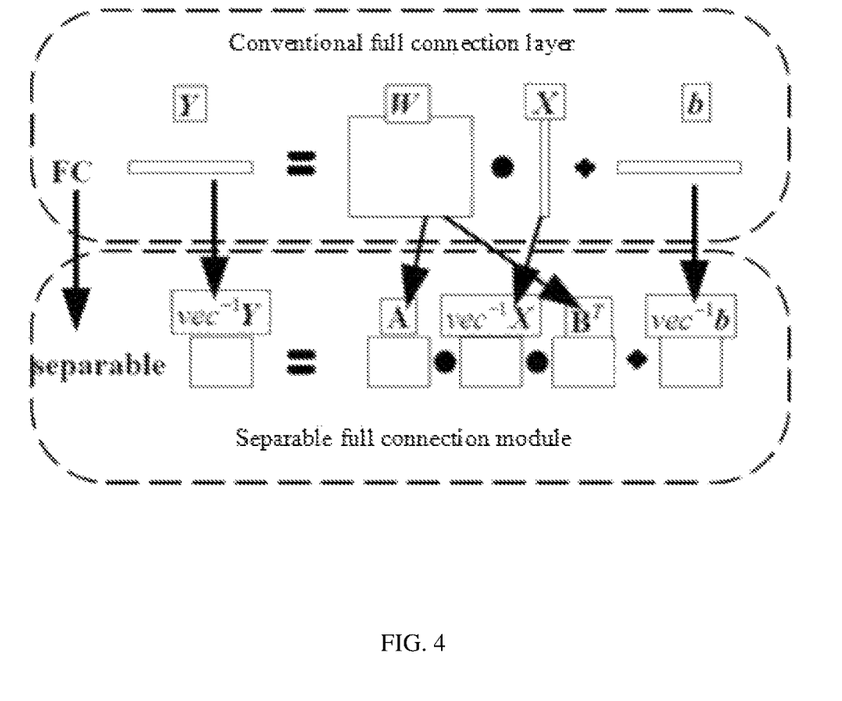
FIG. 4 is a process diagram of replacing the conventional full connection layer weight matrix with two separable weight matrixes.

FIG. 4 shows the lightweight separable full connection module designed for this method, for the full connection layer, as shown in the conventional full connection module in the FIG. 4, if the input vector is $X \in \square^{m \times 1}$ and the output vector is $Y \in \square^{n \times 1}$, the full connection layer may be expressed as:

$$Y = \sigma(WX + b),$$

where $W \in \square^{n \times m}$ and $b \in \square^{n \times 1}$ represent the learnable weight matrix and offset, respectively, and $\sigma(\cdot)$ represents the nonlinear excitation function. The weight matrix $W \in \square^{n \times m}$ may be decomposed into two small weight matrixes $A \in \square^{h \times a}$ and $B \in \square^{w \times b}$ to make:

$$W = B \otimes A,$$

where n=hw and m=ab are satisfied. The following formulas may be obtained by formula deformation:

$$Y = \sigma(WX+b)$$

$$Y = \sigma[(B \otimes A)X+b]$$

$$\Leftrightarrow vec^{-1}(Y) = \sigma[Avec^{-1}(X)B^T + vec^{-1}(b)],$$

where $vec^{-1}(*)$ is an operation to convert a column vector into a corresponding matrix, so the full connection layer of formula (1) may be rewritten as the product of the input matrix $vec^{-1}(X)$ and two small parameter matrices $A \in \square^{h \times a}$ and $B \in \square^{w \times b}$, and the rewritten network structure may be turned into a separable layer. $vec^{-1}(Y) \in \square^{h \times w}$ is the output of the separable layer, $ver^{-1}(X) = \square^{a \times b}$ is the input of the separable layer, and $vec^{-1}(b) \in \square^{h \times w}$ is the learnable offset. Therefore, the parameter of a separable layer is ha+wb+hw, while the parameter of a full connection layer is ab×hw+hw. If both of them do not consider the influence of offset parameters, the ratio of parameters may be expressed as follows:

$$\frac{N(\text{separable})}{N(FC)} = \frac{ha+wb}{ab \times hw} = \frac{1}{bw} + \frac{1}{ah},$$

because a, b, h, w>>1, it may be inferred that:

$$\frac{N(\text{separable})}{N(FC)} \square 1,$$

therefore, the number of parameters may be greatly reduced by replacing the full connection layer with the separable layer structure.

In the separable asymmetric convolution module, as shown in FIG. 2, most of the computation is mainly focused on the point-by-point convolution. Therefore, this method puts the pruning emphasis on the point-by-point convolution layer. Suppose that there are M channels merged after channel shuffling in FIG. 2, and each channel is represented as $(F_1, F_2, \ldots, F_M)$, and the channel size is $D_K \times D_K$, and the size of a filter $(K_1, K_2, \ldots, K_M)$ is 1×1×M, then the convolution process of a 1×1×M filter $(K_1, K_2, \ldots, K_M)$ may be described as follows:

$$\begin{bmatrix} F_1 \\ F_2 \\ \vdots \\ F_M \end{bmatrix} * \begin{bmatrix} k_1 \\ k_2 \\ \vdots \\ k_M \end{bmatrix} = \sum_{i=1}^{M} F_i k_i,$$

an output feature map $$\sum_{i=1}^{M} F_i k_i$$

may be obtained from this formula, where $F_i \cdot k_i$ represents the multiplication of the weight coefficient $k_i$ and each element on the feature map $F_i$. For N filters, N feature maps will be obtained, which may be expressed as $$\sum_{j=1}^{N} \sum_{i=1}^{M} F_i k_i.$$

The pruning method ranks the importance of convolution kernel, and calculates L1 norm for each trained point-by-point convolution filter, that is:

$$W^1 = \sum_{i=1}^{M} |k_i|.$$

Figure 5:
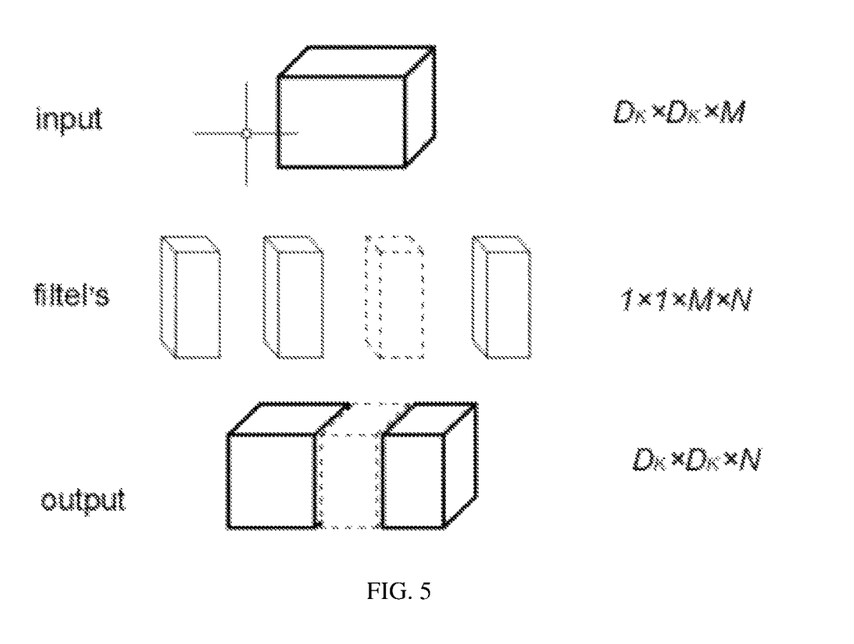
FIG. 5 is a flow chart of pruning.

The importance of the channel is ranked by the magnitude of L1 norm, that is, the larger the L1 norm, the more important the convolution filter is. FIG. 5 is the pruning process of this method. If the L1 norm corresponding to the dashed filter is small, the corresponding filter is deleted.

In specific implementation steps, the traffic sign depth neural network model is compressed mainly by balancing the relationship between pruning rate $\lambda$ (setting the initial pruning rate as 50%) and accuracy. Specifically, firstly, the threshold value $\eta$ (1%) of the accuracy decline of the model is defined to ensure that the model compression is carried out within the allowable range of model accuracy decline. The method first calculates the L1 norm of each filter in the point-by-point convolution process, then ranks the L1 norms from small to large, and determines the pruning threshold $\theta$ according to the pruning rate $\lambda$, as shown in the following formula:

$$n_p = (1-\lambda) n_w$$

Where $n_w$ represents the number of filters in the point-by-point convolution process, and $n_p$ is the number of filters after pruning, then the L1 norm of each filter W is counted from large to small, and when the count reaches $n_p$, the L1 norm value at this time is the pruning threshold $\theta$. By setting the corresponding filter whose L1 norm value is less than the pruning threshold $\theta$ to 0, the pruned model $W_p$ is finally obtained as follows:

$$W_p = \begin{cases} W \times 1, & (|W| > \theta) \\ W \times 0, & (|W| < \theta) \end{cases}.$$

After pruning, the model is fine-tuned and retrained. If the accuracy loss of the model exceeds 1% after pruning, it is judged whether it is the first pruning result. If it is the first pruning result, the pruning rate is reduced with a step length of 10%. If the accuracy loss of the model after the final training is less than 1%, the model is saved and the pruning rate is increased with a step length of 2%; the pruning is continuously to perform until the accuracy loss of the model exceeds the set accuracy drop threshold $\eta$ (1%), so that the last pruned model is the required traffic sign recognition model. The model may ensure a large compression ratio and maintain the accuracy.

Through the following experiments, the accuracy and speed of traffic sign recognition in this embodiment are tested.

The MPSoCZCU106 development board is used as the embedded test platform. The lightweight traffic sign recognition model proposed by the application is tested. The experimental method is as follows:
1) the designed lightweight neural network is trained by the processed traffic sign data set on the GPU platform; the trained lightweight neural network model is pruned to obtain the pruned model.
2) the trained network model is deployed on the ARM processor through format conversion.
3) the lightweight traffic sign recognition network is tested with the processed traffic sign data set. Using ncnn deep learning framework, the test program is written based on C++ programming language. The results show that the traffic sign recognition method based on the lightweight network provided by the application may balance the model accuracy and ensure a great compression range. The practicability of this method in embedded computing platform is proved.

The above is only the preferred embodiment of the present application, so it cannot be used to limit the scope of implementation of the present application, and equivalent changes and modifications made according to the scope of the patent application and the contents of the specification should still fall within the scope of the present patent.

What is claimed is:

1. A traffic sign recognition method based on a lightweight neural network, comprising following steps:
    step 1, acquiring initial traffic sign image data;
    step 2, data preprocessing: preprocessing the initial traffic sign image data to obtain a traffic sign data set with a training set and a test set;
    step 3, setting an initial training super-parameter, inputting a training set part of the traffic sign data set into a lightweight neural network model for a training, and recognizing a trained lightweight neural network model by using a test set part of the traffic sign data set; the lightweight neural network model comprises a convolution feature extraction part and a classifier part; the convolution feature extraction part comprises a layer of conventional 3×3 convolution and 16 layers of separable asymmetric convolution; the separable asymmetric convolution comprises a first separable asymmetric convolution and a second separable asymmetric convolution; the first separable asymmetric convolution firstly carries out feature separation on each input channel; secondly, a 1×3 convolution and a 3×1 convolution with a step length of 1 and a padding of 0 are respectively performed on each channel; after the convolution, obtaining two single-channel feature maps with same sizes by a nonlinear Relu, rectified linear unit, activation function; then summing corresponding elements of the two single-channel feature maps respectively, and performing a batch normalization on each channel summed and by an Relu activation function in turn; then merging and shuffling each newly formed channel; finally, performing a 1×1 convolution with a step length of 1 on output channels, and setting a number of convolution kernels equal to a number of input channels;
    the second separable asymmetric convolution firstly carries out feature separation on the each input channel; secondly, a 1×3 convolution and a 3×1 convolution with a step length of 1 and a padding of 0 are respectively performed on each channel; after the convolution, obtaining two single-channel feature maps with same sizes by a nonlinear Relu activation function; then summing corresponding elements of the two single-channel feature maps respectively, and performing a batch normalization on each channel summed and by an Relu activation function in turn; then merging and shuffling each newly formed channel; finally, performing a 1×1 convolution with a step length of 2 on output channels to complete a downsampling of the feature maps, and setting a number of the convolution kernels equal to a number of input channels; wherein the classifier part comprises three layers of separable full connection modules;
    step 4, checking whether a recognition accuracy of the model on the test set reaches more than 90%, if not meet requirements, adjusting the training super-parameter and going to the step 3; otherwise, going to step 5;
    step 5, pruning the lightweight neural network model, setting an initial pruning rate to 50%, then performing a retraining on a pruned lightweight neural network model on the training set of the traffic sign data set, and recognizing a trained pruned lightweight neural network model on the test set of the traffic sign data set;
    step 6, checking the recognition accuracy of the trained pruned lightweight neural network model; if a loss of the recognition accuracy is less than 1%, saving the model and continuing to increase the pruning rate with a step length of 2%, and turning to the step 5, if the loss of the recognition accuracy exceeds 1%, judging whether it is a first pruning result; if it is the first pruning result, reducing the pruning rate with a step length of 10% and returning to the step 5; if it is not the first pruning result, going to step 7;
    step 7, saving the pruned lightweight neural network model last time; and
    step 8, deploying the pruned lightweight neural network model last time in a vehicle-mounted system to recognize traffic signs on a road.

2. The traffic sign recognition method based on a lightweight neural network according to claim 1, wherein a structure of the conventional 3×3 convolution is as follows: the number of input channels is 3, a number of output channels is 64, a convolution kernel size is 3×3, the number of the convolution kernels is 64, the step length is 1, and the padding is 0; after the conventional 3×3 convolution, a feature map with a length and a width of 64×64 and a channel of 64 is obtained.

3. The traffic sign recognition method based on a lightweight neural network according to claim 1, wherein 2nd to 5th layers of the convolution feature extraction part adopt the first separable asymmetric convolution, wherein a full line part of a residual connection mode indicates that the 1×1 convolution with a step length of 1 is adopted, and the number of the convolution kernels is 64; after the first separable asymmetric convolution of the 2nd to the 5th layers, a feature map with a length and a width of 64×64 and a channel of 64 is obtained;
    a 6th layer of the convolution feature extraction part adopts the second separable asymmetric convolution, and after the second separable asymmetric convolution of the 6th layer, a feature map with a length and a width of 32×32 and a channel of 64 is obtained;
    $7^{th}$- to $11^{th}$ layers of the convolution feature extraction part adopt the first separable asymmetric convolution, wherein a dotted line part of the residual connection mode indicates a 1×1 convolution with a step length of 2 is adopted, and the number of the convolution kernels is 64, while the full line part of the residual connection mode adopts a 1×1 convolution with a step length of 1, and the number of the convolution kernels is 64; after the first separable asymmetric convolution of the $7^{th}$- to $11^{th}$ layers, a feature map with a length and width of 32×32 and a channel of 64 is obtained;
- a 12th layer of the convolution feature extraction part adopts the second separable asymmetric convolution, and after the second separable asymmetric convolution of the 12th layer, a feature map with a length and width of 16×16 and a channel of 64 is obtained;
- $13^{th}$- to $15^{th}$ layers of the convolution feature extraction part adopt the first separable asymmetric convolution, wherein the dotted line part of the residual connection mode indicates a 1×1 convolution with a step length of 2 is adopted, and the number of the convolution kernels is 64; the full line part of the residual connection mode adopts 1×1 convolution with step length of 1, and the number of the convolution kernels is 64; after that first separable asymmetric convolution of the $13^{th}$- to $15^{th}$ layers, a feature map with a length and a width of 16×16 and a channel of 64 is obtained;
- a 16th layer of the convolution feature extraction part adopts the second separable asymmetric convolution; after the second separable asymmetric convolution of the 16th layer, a feature map with a length and a width of 8×8 and a channel of 64 is obtained;
- a 17th layer of the convolution feature extraction part adopts the first separable asymmetric convolution; wherein the dotted line part of the residual connection mode indicates that a 1×1 convolution with a step length of 2 is adopted, and the number of the convolution kernels is 64; after the first separable asymmetric convolution of the 17th layer, a feature map with a length and a width of 8×8 and a channel of 64 is obtained.

4. The traffic sign recognition method based on a lightweight neural network according to claim 3, wherein a BN layer and an activation layer are added after each convolution operation in the separable asymmetric convolution, and activation functions used by the activation layer are all Relu functions.

5. The traffic sign recognition method based on a lightweight neural network according to claim 1, wherein a first layer of separable full connection module of the classifier part firstly converts a feature map of a previous layer with a length and a width of 8×8 and a channel of 64 into a shape of 64×64, and then initializes two weight matrixes with sizes of 64×64 respectively, namely A-1 and B-1, and then, performs a matrix multiplication with a matrix A-1 and an input after a dimension conversion, and an obtained result is matrix multiplied with the matrix B-1 to obtain an output matrix with a size of 64×64 of a next layer;
- a second layer of separable full connection module firstly respectively initializes two weight matrixes with sizes of 64×64, namely A-2 and B-2, and finally a matrix A-2 is used to perform the matrix multiplication with an output matrix of a previous layer with a size of, and then an obtained result is matrix multiplied with the matrix B-2 to obtain an output matrix with a size of 64×64 of a next layer;
- a third layer of separable full connection module firstly respectively initializes two weight matrixes with sizes of 1×64 and 64×64, namely A-3 and B-3, and then performs the matrix multiplication with an output matrix with a size of 64×64 of a previous layer with a matrix A-3, and then an obtained result performs the matrix multiplication with the matrix B-3 to obtain an output matrix with a size of 1×64 of a next layer; finally, the output matrix is flattened after a Flatten operation, and a softmax activation function is used to recognize 64 categories of traffic signs.

6. The traffic sign recognition method based on a lightweight neural network according to claim 1, wherein the data preprocessing comprises determining a size of traffic sign image data, selecting appropriate candidate frames, completing a clipping of the initial traffic sign image data, uniformly setting clipped color images with a resolution of 64×64, classifying clipped data, and expanding each category data by using a data enhancement method; the data enhancement method specifically comprises a slight horizontal or vertical translation of images, an adjustment of image saturation and a whitening treatment to make a number of traffic sign categories consistent, then marking the traffic sign image data, and then dividing the training set and the test set according to a ratio of 8:2 to construct the traffic sign data set.

* * * * *